(12) United States Patent
Bybee

(10) Patent No.: US 6,373,999 B2
(45) Date of Patent: Apr. 16, 2002

(54) PHOTOELECTRIC IMAGING APPARATUS AND METHOD OF USING

(75) Inventor: Jerry L. Bybee, Loveland, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/120,532

(22) Filed: Jul. 22, 1998

(51) Int. Cl.[7] .............................. G06K 7/00; G01J 3/50
(52) U.S. Cl. ...................................... 382/312; 250/226
(58) Field of Search ................................ 382/312, 313, 382/314, 315, 316, 317, 321; 250/234, 239, 226, 235, 218; 358/29, 227, 228, 903

(56) References Cited

U.S. PATENT DOCUMENTS

| | | | | |
|---|---|---|---|---|
| 4,158,194 A | * | 6/1979 | McWaters et al. | .... 340/146.354 |
| 4,315,245 A | * | 2/1982 | Nakahara et al. | ........... 382/274 |
| 4,901,364 A | * | 2/1990 | Faulkerson et al. | ......... 389/312 |
| 4,926,041 A | * | 5/1990 | Boyd | .......................... 250/226 |
| 5,182,450 A | | 1/1993 | Pan | ............................. 250/234 |
| 5,301,243 A | | 4/1994 | Olschafskie et al. | ........ 382/313 |

* cited by examiner

Primary Examiner—Jose L. Couso
Assistant Examiner—Duy M. Dang

(57) ABSTRACT

A photoelectric imaging device is disclosed in which the object to be imaged is illuminated by light from an external light source, such as a video display. Use of an external light source eliminates the need for a light source and its accompanying power supply to be located within the photoelectric imaging device. The portability of the photoelectric imaging device is thus enhanced. When a video display is used as the external light source, an external computer, to which the video display may be attached, may accomplish the processing required for imaging. This allows further reduction in the size, weight, complexity and cost of the photoelectric imaging device by eliminating the need for a processor and a data storage device to be located within the photoelectric imaging device.

30 Claims, 5 Drawing Sheets

PHOTOELECTRIC IMAGING APPARATUS AND METHOD OF USING

FIELD OF THE INVENTION

The present invention relates generally to photoelectric imaging devices and, more particularly, to a photoelectric imaging device adapted to use an external light source to illuminate the object being imaged.

BACKGROUND OF THE INVENTION

Photoelectric imaging devices are well known in the art and produce machine-readable data representative of an object which is imaged, e.g., a page of printed text. One type of photoelectric imaging device is an optical scanning device. In an optical scanning device, an object is moved relative to the optical scanning device or visa versa as the optical scanning device generates data representative of the object. The data generated may be in the form of binary numbers and stored in a data storage device for processing. The following patents which describe optical scanners are hereby incorporated by reference for all that is disclosed therein: U.S. Pat. No. 5,552,597 of McConica for HAND-HELD SCANNER HAVING ADJUSTABLE LIGHT PATH; U.S. Pat. No. 5,646,394 of Steinle for IMAGING DEVICE WITH BEAM STEERING CAPABILITY; and U.S. Pat. No. 5,680,375 of Cristie et al. for ULTRAPORTABLE SCANNER.

Some photoelectric imaging devices employ line-focus systems, which image an object by sequentially focusing narrow "scan line" portions of the object onto a linear photosensor array. Examples of photoelectric imaging devices that use line-focus systems include optical scanning devices and facsimile machines. Scanning is performed by illuminating the object and focusing a line portion of the light reflected from the object onto the photosensor array. The narrow strip or line portion of the object which is imaged on the linear photosensor array is usually called a "scan line." As the object is moved relative to the photoelectric imaging device, a plurality of scan line images are formed, which taken collectively, represent the object.

A photosensor array generally consists of a linear array of photodetector elements (or simply photodetectors), which correspond to small area locations on the scan line. These small area locations on the scan line are commonly referred to as "picture elements" or "pixels." The corresponding photodetectors themselves are also sometimes referred to as pixels. In response to light from its corresponding pixel location on the scan line, each photodetector in the photosensor array produces a data signal which is representative of the light it experiences during an interval of time known as a sampling interval. The data signals from the photodetectors may be received and processed by an appropriate data processing system.

Monochrome optical scanners generate machine-readable data corresponding to a single monochrome image of the object being scanned. A monochrome scanner may, for example, generate a "black and white" image of a scanned object regardless of the actual colors contained in the object. In a color, or polychrome, optical scanner, machine-readable data is generated corresponding to a plurality of monochrome components (typically, red, green and blue) appearing in the object. Generally, the monochrome components are combined to arrive at a polychrome (color) image of the object.

Several methods for accomplishing color optical scanning are known in the art. One such method, known as a "multi-pass" scanning method, involves scanning the object several times. On the first "scanning pass", monochrome scan line images of the object corresponding to a single color (e.g., red) are impinged onto a single linear photosensor array. On the second scanning pass, monochrome scan line images are acquired which correspond to a second color (e.g., blue). The process is then repeated until the desired number of monochrome images of the object has been acquired. Thereafter, a computer processor may be used to combine the individual monochrome images into a polychrome image of the object. In some multi-pass scanning devices, the light source may be manipulated to provide the desired color of monochrome light during each scanning pass in order to select the color of the monochrome image which is acquired during each pass. In other multi-pass scanning devices, a plurality of filters may be selectively placed between the object and the photosensor array in order to select the color during each pass.

Another method for accomplishing color optical scanning is known as a "single pass" scanning method. In single pass color scanning, a plurality of linear photosensor arrays (e.g., three) may be used. Each of the photosensor arrays receives light of a different color (e.g., red, green and blue). In this manner, all of the desired monochrome images of the object may be acquired in a single scanning pass. Each of the linear photosensor arrays may be provided with a filter to cause the desired color of light to be impinged on the array. Alternatively, an optical beam splitting device may be used to separate light from the object being scanned into a plurality of monochrome components. Examples of optical scanning devices using such beam splitting devices are disclosed in the following U.S. Pat. No. 5,410,347 of Steinle et al. for COLOR OPTICAL SCANNER WITH IMAGE REGISTRATION HOLING ASSEMBLY; U.S. Pat. No. 4,870,268 of Vincent et al. for COLOR COMBINER AND SEPARATOR AND IMPLEMENTATIONS; U.S. Pat. No. 4,926,041 of Body for OPTICAL SCANNER (and corresponding EPO patent application no. 90306876.5 filed Jun. 22, 1990) U.S. Pat. No. 5,032,004 of Steinle for BEAM Splitter APPARATUS WITH ADJUSTABLE IMAGE FOCUS AND REGISTRATION (and corresponding EPO patent application no. 91304185.1 filed May 9, 1991); U.S. Pat. No. 5,044,727 of Steinle for BEAM Splitter/COMBINER APPARATUS (and corresponding EPO patent application no. 91303860.3 filed Apr. 29. 1991); U.S. Pat. No. 5,040,872 of Steinle for BEAM Splitter/COMBINER WITH PATH LENGTH COMPENSATOR (and corresponding EPO patent application no. 90124279.2 filed 12/14/90 which has been abandoned); and 5,227,620 of Elder, Jr. et al. for APPARATUS FOR ASSEMBLING COMPONENTS OF COLOR OPTICAL SCANNERS (and corresponding EPO patent application no. 91304403.8 filed May 16, 1991), which are all hereby incorporated by reference for all that is disclosed therein.

There are many types of photosensor devices known in the art. Two types of photosensor devices, however, are commonly used in optical scanning devices. These are the charged coupled device and the contact image sensor. A charged coupled device-type photosensor device is typically a single semiconductor chip with at least one linear array of photodetectors mounted to it. The semiconductor chip is typically much smaller than a desired scan line, so the image of the object must be focused onto the charged coupled device. For this reason, optical scanners using charged coupled devices typically require an extended focal length between the object being imaged and the charged coupled device.

A contact image sensor-type photosensor device is typically a linear arrangement of linear optical arrays. Each linear optical array has at least one linear array of photodetectors mounted to it. One example of a commercially available linear optical array used in a contact image sensor-type photosensor device is available from Texas Instruments, Inc. of Austin, Tex. and sold as model number TSL2301. The linear optical arrays are in close proximity to a lens, which in turn is in close proximity to the object being scanned. The lens typically has a reduction ratio of 1:1. An example of such a lens is the SELFOC lens manufactured by Mirco Optics Company, Limited, a subsidiary of the Nippon Sheet Glass, Limited. SELFOC is a registered trademark of Nippon Sheet Glass, Limited.

The lens receives light reflected from the object and focuses a scan line of the object onto the array of photodetectors. The photodetectors, in turn, output electrical data corresponding to the light they receive. The data from the photodetectors may be processed by a computer as is known in the art. Due to the 1:1 lens ratio, the length of a contact image sensor array of photodetectors may be substantially the same length as the scan line. Accordingly, an extended focal path, as described above with respect to a charged coupled device-type scanner, is not needed in a scanning device using a contact image sensor. An example of a contact image sensor device is disclosed in the U.S. patent Ser. No. 09/120,669 of Kochis et al. for MULTI-SEGMENT LINEAR PHOTOSENSOR ASSEMBLY, filed on Jul. 22, 1998, which is hereby incorporated by reference for all that is disclosed herein.

As computers and processing equipment have become smaller and less expensive, attempts have been made to make scanning devices more portable and less expensive. Improving portability includes making a scanning device which is easily transportable in that it is light weight, small, and uses minimal power. Likewise, optical systems for portable scanning devices must generally be very compact and light weight due to the constraints of their operation. The cost, size and weight of optical scanning devices may be reduced by limiting the number of components that are required to operate the optical scanning devices.

Conventional optical scanning devices require various onboard components in order to operate properly. These components include a light source, various optical components, including at least one photosensor device, a power source, a processor, a data storage device, and function buttons. The need for a light source dictates that a power source be provided to supply the light source. The processor is required to read the data from the photosensor device, convert the data to a form that may be read by a machine, and store the data in the data storage device. Function buttons may also be required as a user interface between the user and the optical scanning device.

The power source requirements and the internal devices required to operate optical scanning devices limit portability and increase the cost of optical scanning devices. The power source requirements and internal devices add bulk, weight, and expense to the optical scanning devices. The power source requirements also necessitate that optical scanning devices be operated in close proximity to an electrical source or be provided with batteries. If optical scanning devices are operated from an electrical source, such as an electrical outlet, the electrical source must be converted to a voltage which will operate the scanning electronics. Adding a voltage converter to an optical scanning device adds further weight, bulk and expense to the optical scanner. Batteries may be used to operate the light source and processing electronics; however, batteries are generally heavy, expensive, and require recharging or replacing.

Therefore, it would be generally desirable to provide a photoelectric imaging device that requires fewer onboard components and, thus, overcomes the aforementioned problems associated with photoelectric imaging devices.

SUMMARY OF THE INVENTION

The present invention is directed to an improved photoelectric imaging device which does not require an onboard light source. The improved photoelectric imaging device is configured to utilize light from an external source to illuminate the object being imaged. The external light source may be a linear source, such as a tube-shaped lamp, or it may be a planar source, such as a video display used with a desktop or laptop computer. The improved photoelectric imaging device, thus, does not require either a light source or an associated power source to be physically located within the photoelectric imaging device.

One application of the improved photoelectric imaging device is in an optical scanning device. The following description summarizes the improved photoelectric imaging device as used in an optical scanning device. It is to be understood, however, that the improved photoelectric imaging device is applicable to other types of imaging devices as well.

The improved scanning device is configured to collect light from an external light source in order to illuminate the object which is to be scanned. The configuration of the scanning device may be such that light from the external source enters the bottom of the scanning device and travels through the scanning device to illuminate the object, which may be located on top of the scanning device. In one embodiment, the scanning device may be configured to focus light from a video display onto the object which is to be scanned, thereby using the video display as the external light source.

The external light source may be operated to provide a light source for either a monochrome or a polychrome scan. In the case of monochrome scanning, the external light source may, for example, emit either white or green light to illuminate the object to be scanned. In the case of polychrome scanning, the external light source may emit a full spectrum of light necessary to image the colors in the object, e.g., red, green, and blue spectral components.

The external light source may emit light over an area that is wide enough to illuminate the object, and thus, may be adequately used to illuminate a scan line on the object. Light reflected from the illuminated object may then be focused onto a photosensor device located in the scanning device. The photosensor device may then convert the reflected light to electrical data for processing.

During a scan, the object to be imaged may be passed over an illumination area on the scanning device. As the object is passed over the illumination area of the scanning device, light from the external light source illuminates the object. The reflected light from the illuminated object, in the form of a scan line, is focused onto the photosensor device. As scanning occurs, the accrual of scan lines may be processed and stored by an external computer, eliminating the need for an onboard processor located within the scanning device. Alternatively, the data processing and storage may be performed by a processor that is internal to the scanning device.

The improved scanning device may be made particularly portable and economical when the external light source is a video display as used with an external computer. In this case, no light source is required to be located within the improved scanning device and, therefore, no power supply for the light source is required to be located within the improved scanning device. The improved scanning device may further use the external computer to process the image data, further decreasing the weight, size, cost and complexity of the improved scanning device by eliminating the need for a complex processor and a data storage device to be located within the improved scanning device. The external computer may also control the spectral components emitted by the video display.

DETAILED DESCRIPTION OF THE INVENTION

Figure 1:
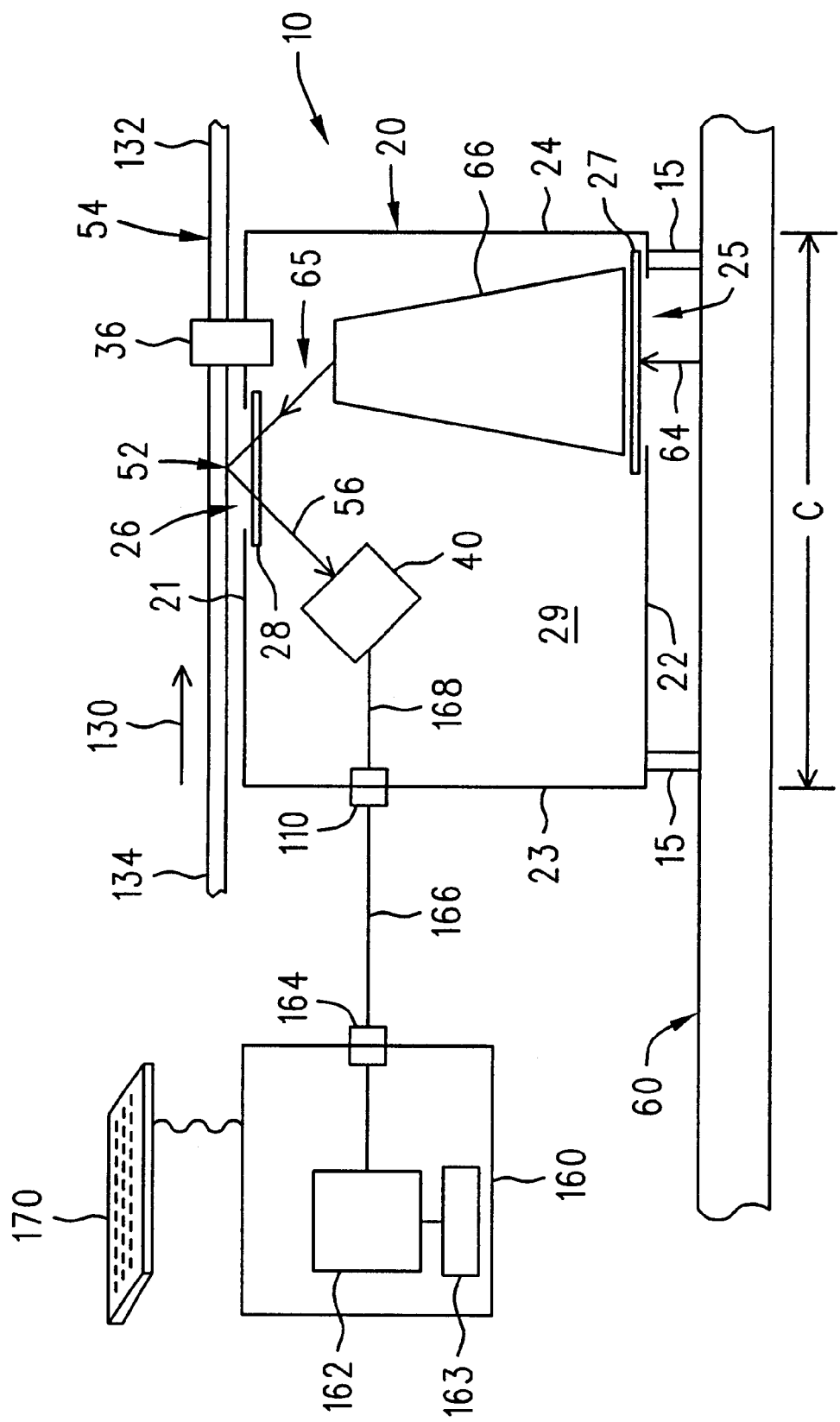
FIG. 1 is a cutaway view of the scanning device located adjacent to a video display.

FIGS. 1–5, in general, illustrate a photoelectric imaging apparatus 10, depicted as an optical scanning device, for producing machine-readable data representative of an imaged object 54, FIG. 1. The photoelectric imaging apparatus 10 includes a housing 20; at least one photosensor device 40 located within the housing 20; a first light path 56 extending within the housing 20 and adapted to pass light from a first portion 52 of the object 54 to the photosensor device 40; and a second light path extending within the housing 20 and adapted to transmit light from between point external to the housing 20 and the first portion 52 of the object 54.

FIGS. 1–5 also illustrate, in general, a system for producing machine-readable data representative of an imaged object 54. The system includes a housing 20; a light source 60 located external to the housing 20; at least one photosensor device 40 located within the housing; a first light path 56 extending within the housing 20, the first light path 56 adapted to pass light from a first portion 52 of the object 54 to the photosensor device 40; and a second light path 56 extending within the housing 20, the second light path 56 adapted to transmit light from between a point external to the housing 20 and the first portion 52 of the object 54.

FIGS. 1–5 also illustrate, in general, a method of scanning an object 54 with a photoelectric imaging apparatus 10. The method includes illuminating the object 54 which is to be imaged with light 65 emitted from an external light source 60; maintaining relative movement between the object 54 to be imaged and the imaging apparatus 10; and reflecting light 56 illuminating the object 54 onto a photosensor device 40.

Having generally described the improved photoelectric imaging device and a method of photoelectric imaging, the device and method will now be described in further detail.

The following description illustrates the improved photoelectric imaging device as an optical scanning device. However, it is to be understood that this description is for illustration purposes only and that the improved photoelectric imaging device may readily take the form of other imaging devices as well.

FIG. 1 illustrates the improved scanning device 10, which is configured to use light 64 from an external light source to illuminate the object 54 being scanned. The external light source may be in be in the form of a planar or linear source, so as to illuminate a scan line portion 52 of the object 54. Examples of linear external light sources include a tube-shaped lamp and a linear array of light emitting diodes. An example of a planar source is a video display. For the purposes of illustration, the scanning device 10 will be described below in conjunction with a video display 60 as the external light source. However, it is to be understood that the scanning device 10 may, alternatively, be used in conjunction with any of the aforementioned external light sources.

Referring again to FIG. 1, the scanning device 10 may include a housing 20. The housing 20 may include a top wall 21, a bottom wall 22, a left wall 23, a right wall 24, and two ends (only the end 29 is shown in FIG. 1). The housing 20 may be generally configured as a parallelepiped-shaped structure. A portion of the bottom wall 22 of housing 20 may have an opening 25 to allow light 64 from the video display 60 to enter the housing 20. A portion of the top wall 21 of housing 20 may also have an opening 26 to allow light from the video display 60 to illuminate a scan line portion 52 of the object 54. A piece of glass or other transparent material 27 may be placed in the bottom opening 25 of the housing 20 in order to keep contaminates from entering the housing 20. Likewise, a piece of glass or other transparent material 28 may be placed in the top opening 26 of the housing 20 to keep contaminates from entering the housing 20. A seal 15 may be attached to the lower wall 22 such that it is located between the housing 20 and the video display 60 as shown in FIG. 1. The seal 15 serves to prevent extraneous light from entering the interior of housing 20 when a scan is being performed. The seal 15 may be a foam type material that is not transparent. Two fastening straps 41 and 42, FIG. 4, may be attached to the housing 20 to fasten the housing 20 to the video display 60. The fastening straps 41 and 42 may, for example, use VELCRO to attach the scanning device 10 to the video display 60. VELCRO is a registered trademark of the Velcro Corporation of Manchester, New Hampshire.

A strap 36 may be attached to the top wall 21 of the housing 20 to hold the object 54 against the housing 20 during a scan. The strap 36 may be secured to housing 20 so that the object 54 may be placed between the strap 36 and the housing 20 as illustrated in FIG. 1. The strap 36 may extend in a direction which is perpendicular to the scan direction 130. The strap 36 may be located adjacent to opening 26 in the housing 20 so that when the object 54 is under strap 36, the object 54 may be illuminated. The strap 36 may be constructed from a rigid material such as metal or plastic.

Additionally, an input/output port 110 may be located on the surface of housing 20. The port 110 may serve to relay data between the scanning device 10 and external devices. The port 110 may be a physical connection device such as an industry standard "IEEE-1284" type connector or it may be a non-contact connection apparatus such as an infrared communication port.

The housing 20 may contain the components necessary to illuminate and image the object 54. Specifically, a lens 66 and at least one photosensor device 40 may be located within the housing 20. A data line 168 may also be located within the housing 20. Data line 168 may be connected between the photosensor device 40 and the port 110 and may serve to relay data between external devices and the photosensor device 40.

Figure 2:
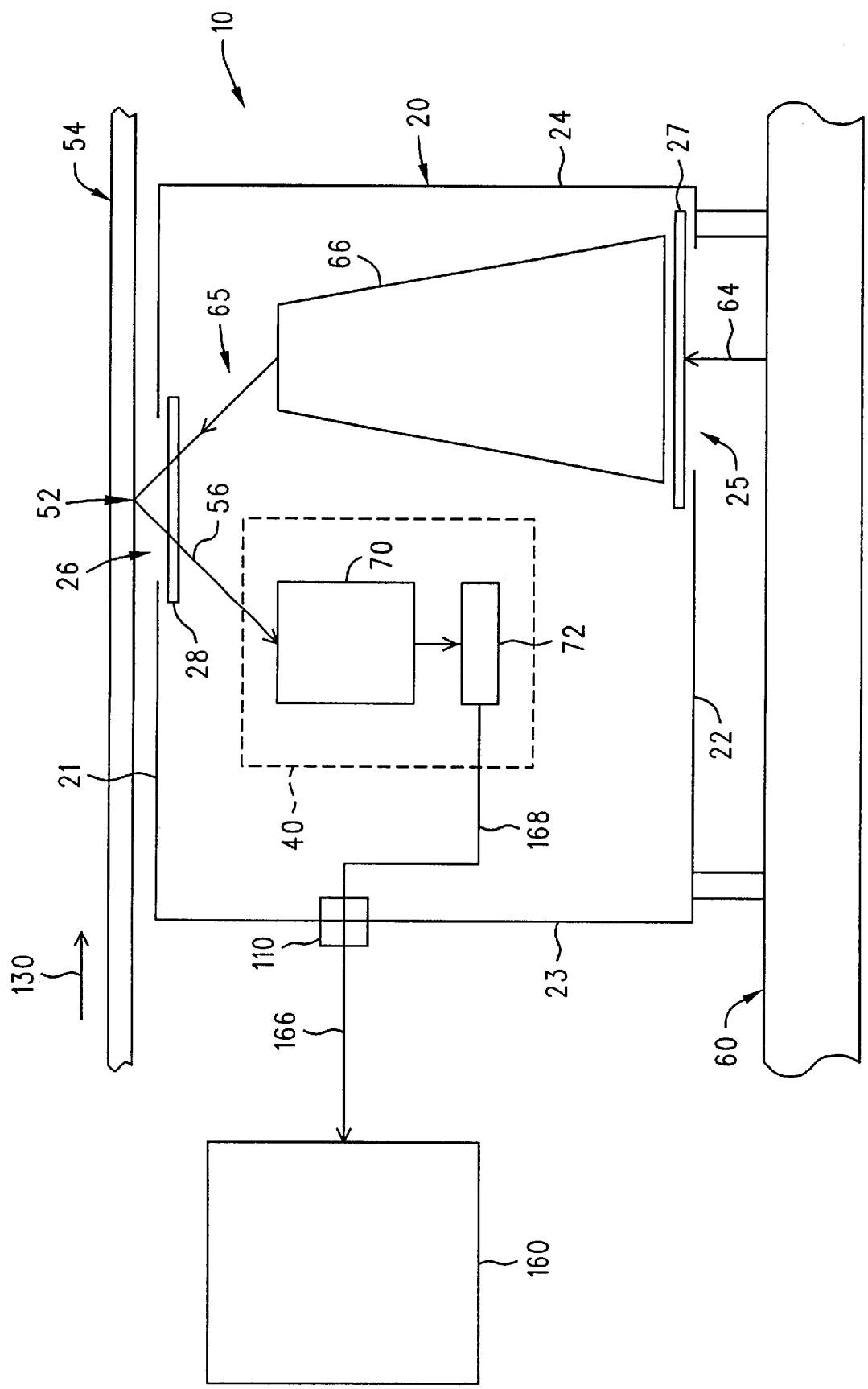
FIG. 2 is a schematic illustration of the optical path used for an optical scanning device.

The lens 66 may be in a light path between the bottom opening 25 and the top opening 26 of the housing 20. Lens 66 may be a standard lens as is known in the art, or it may be a prism or a fiber optic assembly which serves to collect light 64 external to the housing 20 and concentrate the light onto the object 54. The photosensor device 40 may be located within the housing 20 at the termination of a light path 56 wherein the light path 56 commences at the object 54. The photosensor device 40 may comprise an optical device 70 and a photoelectric device 72, as illustrated in FIG. 2. The optical device 70 may be located at the termination of the light path 56 and serves to focus light 56 onto the photoelectric device 72.

Figure 3:
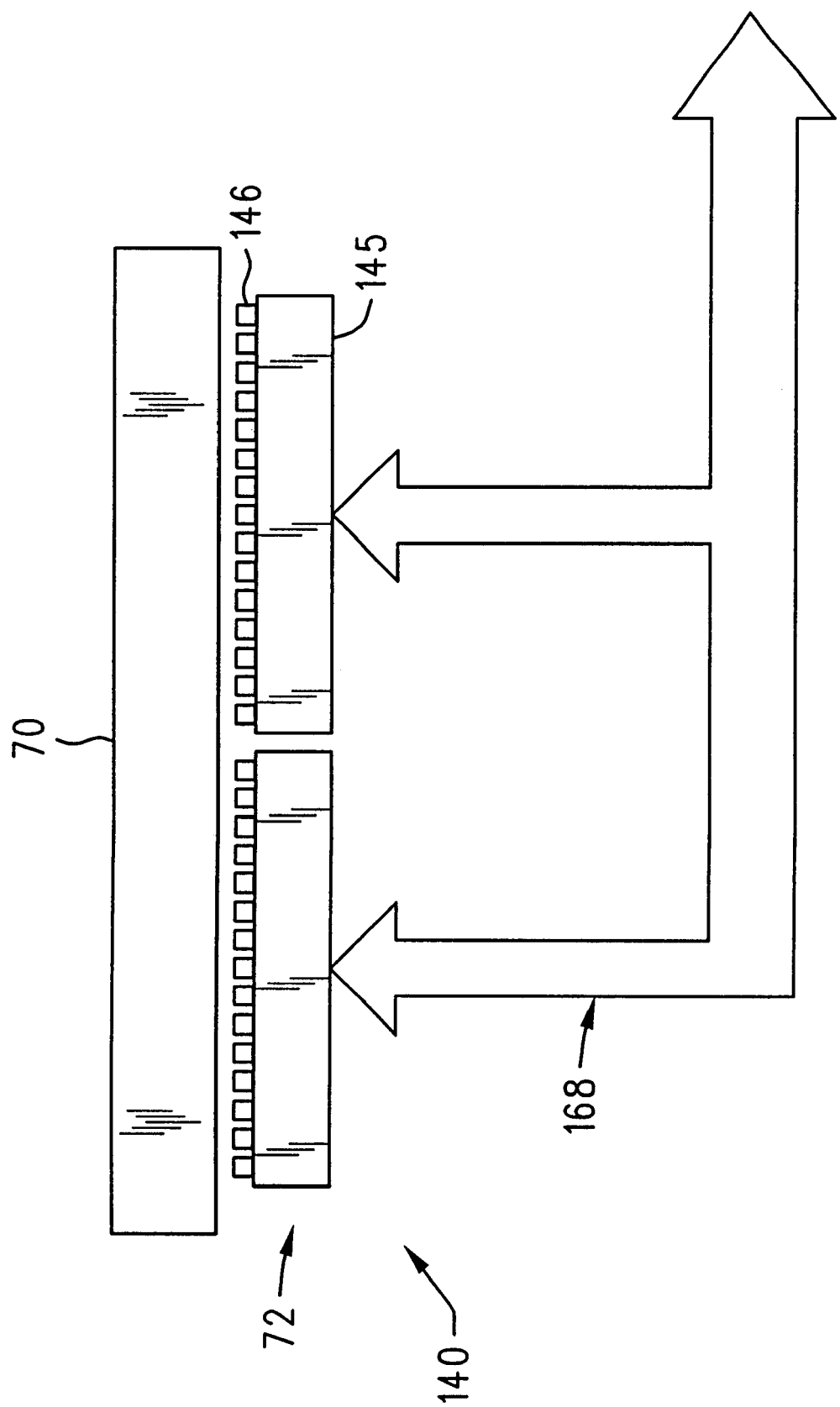
FIG. 3 is a schematic illustration of a contact image sensor-type photosensor device.

The photosensor device 40 may be a contact image sensor-type device as shown schematically in FIGS. 2 and 3. When the photosensor device 40 is a contact image sensor-type device, the optical device 70 may be a lens and the photoelectric device 72 may be at least one linear optical array. In a contact image sensor, the optical device 70 is typically a lens with a reduction ratio of 1:1. An example of the lens is the SELFOC lens manufactured by Nippon Sheet Glass Limited. SELFOC is a registered trademark of Nippon Sheet Glass Limited. The photoelectric device 72 may comprise an array of linear optical arrays 145 in close proximity to the lens 70, FIG. 3. The linear optical arrays 145 may contain at least one linear array of photodetectors 146 mounted to the linear optical arrays 145. Due to size constraints, several linear optical arrays 145 may be aligned to form an elongated linear array of photodetectors 146 as illustrated in FIG. 3. The photodetectors 146 may be located so as to face the lens 70.

As an alternative to the contact image sensor-type device described above, the photosensor device 40 may be a charged coupled device-type device. The charged coupled device 72 is generally a single semiconductor and is typically a smaller device than an array of linear optical arrays used in a contact image sensor. Use of a charged coupled device generally requires the image beam 56 to be focused onto the charged coupled device. In this case, the optical device 70 may comprise mirrors and other optical components that fold the image beam 56 to create an extended focal length. The extended focal length allows the image beam 56 to be focused onto the charged coupled device 72.

The contact image sensor does not require the extended focal path of a charged coupled device, so an optical scanner using a contact image sensor may be more compact. However, a contact image sensor does not reduce the image, so the linear optical arrays 145 and photodetectors 146, FIG. 3, typically need to extend the length of a scan line.

Figure 4:
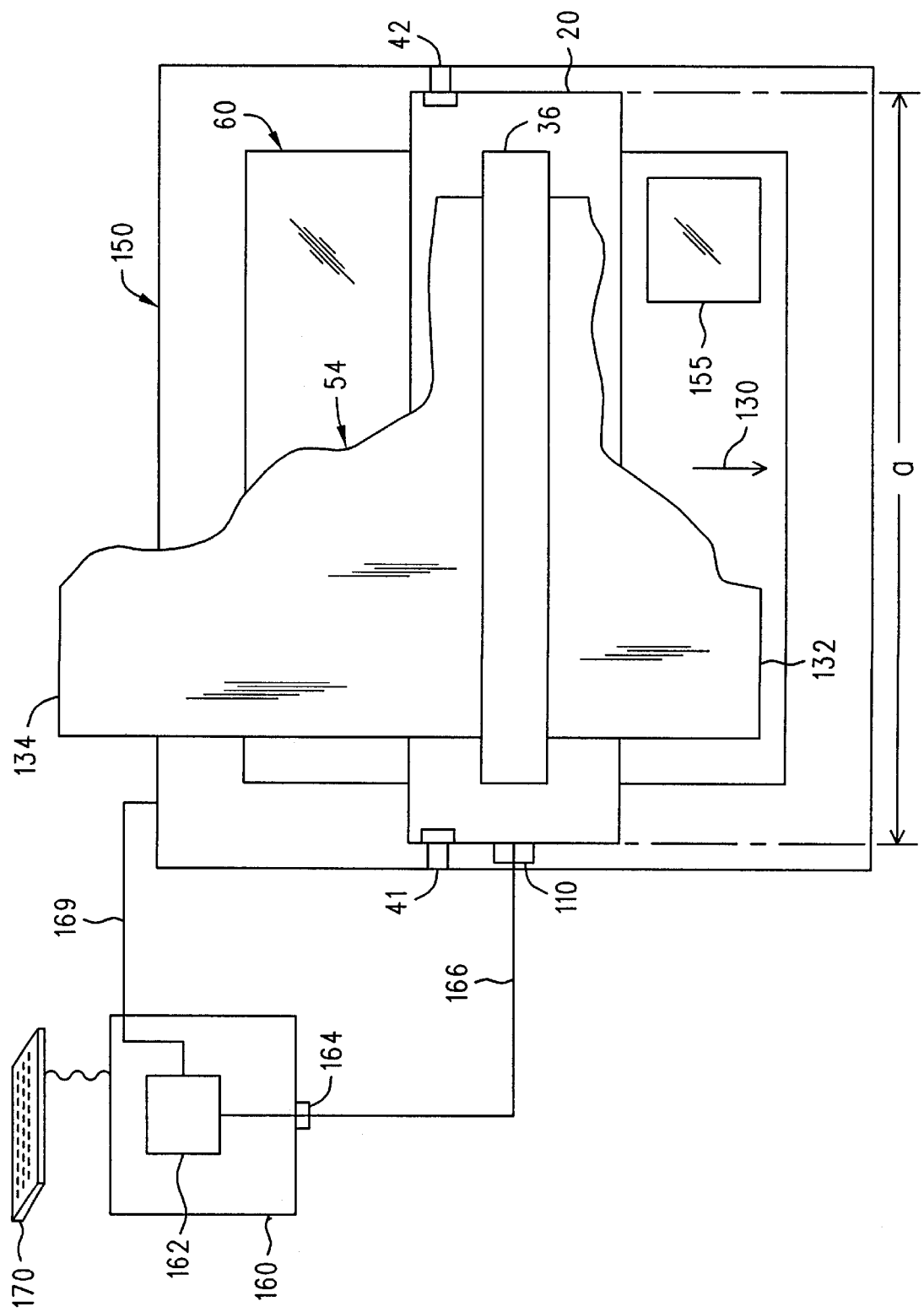
FIG. 4 is a schematic illustration showing the scanning device placed on a video display and scanning a page of text.

FIG. 4 depicts an embodiment of the scanning device 10 positioned on a video display 60 of a video monitor 150 in the process of scanning an object 54. The object 54 being scanned is depicted as a page of text. For the purpose of illustrating the use of the scanning device 10, the video display 60 is being used as the external light source. It is to be understood, however, that other linear or planar light sources may be used in place of the video display 60.

In order to perform a scan of the object 54, the scanning device 10 may be placed adjacent to the video display 60 of a video monitor 150. The area of the video display 60 to which the scanning device 10 is adjacent must emit light during a scanning operation. Controlling the emission of light from a video display is well known in the art. The two fastening straps 41 and 42 may be used to fasten the scanning device 10 to the video monitor.

During a scanning operation, the leading edge 132 of the object 54 may be placed between the strap 36 and the housing 20. The side of the object 54 that is to be scanned is placed facing the housing 20. The user then initiates a scan and pulls the object 54 in the scanning direction 130 between the strap 36 and the housing 20. The entire area of the object 54 which is to be scanned must pass over the opening 26 in the housing 20, FIG. 1, so as to be illuminated.

During the aforementioned scanning operation, the improved scanning device 10 collects light 64 from the video display 60 to illuminate the object 54, FIG. 1. The video display 60 emits light 64 in the form of a planar source. The lens 66 collects a wide area of the light 64 and concentrates it to illuminate a narrow scan line portion 52 of the object 54. The spectrum of light 64 emitted by the video display 60 may be selected depending upon the scanning application. For monochrome scanning, a white or green light source may be emitted by the video display 60. For polychrome scanning, the video display 60 may emit a full spectrum of light (e.g., red, green, and blue) either simultaneously or separately upon separate scans.

Referring again to FIG. 1, light 64 from the video display 60 may pass through the transparent material 27 in the opening 25 in the bottom wall 22 of the housing 20. The light 64 may then enter the lens 66. The lens 66 collects light 64 from the video display 60 and concentrates the light 64 onto the object 54 via the light path 65. Light path 65 extends from the lens 66 through the transparent material 28 in the opening 26 of the housing 20 and to the object 54. In this manner, the object 54 may be illuminated by the light 64 emitted from the video display 60.

Light reflected from the object 54 generates an image beam 56. The image beam 56 is a narrow scan line portion of the object 54. The image beam 56 may pass through the transparent material 28 in the opening 26 of the housing 20. The image beam 56 may then be focused onto the photosensor device 40. The photosensor device 40 generates electrical data representing the scan line portion 52 of the object 54.

Referring to FIG. 2, the image beam 56 may enter the optical device 70, where it is focused onto the photoelectric device 72. The photoelectric device 72 generates a data signal representing light received by the photoelectric device 72. The data signal may be output from the photoelectric device 72 via the data line 168 to the port 110. As the object 54 is moved across the scanning device 10, the photosensor device 40 may continue imaging scan line portions 52 of the object 54 until the entire object 54 has been scanned.

The data generated by the photosensor device 40 may be processed by various methods known in the art. Processing the data generated by the photosensor device 40 may be done by an external computer 160, FIG. 1. Processing the image by the use of the external computer 160 eliminates the need for a microprocessor, a data storage device, associated electronics, and their power supplies to be physically located within the housing 20. The external computer 160 may further function as an interface between the user and the scanning device 10. Using the external computer 160 as an interface eliminates the need for function buttons generally required for scanning devices to be located on the housing 20. The use of the external computer 160 to process the image data further decreases the size, cost, weight, and complexity of the scanning device 10.

Referring to FIG. 1, the external computer 160 may have a processor 162 and a data storage device 163 located within the external computer 160 and an input/output port 164 attached to the external computer 160. The external computer 160 may also be electrically connected to a keyboard 170 and the video display 60 by a data line 169, FIG. 4. The processor 162 may be electrically connected to the port 164, the data storage device 163, the video display 60, and the keyboard 170. The processor 162 must be capable of processing image data from a photosensor device 40 as is well known in the art. The data storage device 163 may be one of many data storage devices known in the art. Examples of data storage devices 163 include random access memory devices and magnetic storage media. The port 164 may be similar to the port 110 located on the housing 20 of the scanning device 10 as previously described. The port 110 on the scanning device 10 and the port 164 located on the external computer 160 may be electrically connected by a data line 166. The keyboard 170 may be any conventional keyboard that connects to a computer as is known in the art.

The data from the photosensor device 40 may be transmitted to the external computer 160 for processing, FIG. 1. The data may be transmitted via the data line 168, through the port 110, via the data line 166, through the port 164 and to the processor 162. The processor 162 may be programmed to perform the image processing on the data transmitted from the photosensor device 40 as is well known in the art. The external computer 160 may also store unprocessed or processed data in the data storage device 163 for use at a later time.

In addition to processing image data, the external computer 160 may also control the scanning operation and provide power to the scanning device 10. Controlling the scanning operation may include interfacing with the user and controlling the external light source. Such user interfaces may be accomplished via the keyboard 170, which may be electrically connected to the external computer 160. The external computer 160 may provide electric power to the scanning device 10 through the port 164 as though the scanning device 10 was a peripheral device as is known in the art. The electric power may be used by the electronic components within the scanning device 10. Using the power from the external computer 160 further decreases the cost, size, weight and complexity of the scanning device 10 by eliminating the need for a power source to be located within the scanning device 10.

Controlling the external light source may be accomplished by electrically connecting the video display 60 to the external computer 160, FIG. 4, as is well known in the art. When the video display 60 is connected to the external computer 160, the user may control the spectrum of light emitted by the video display 60. Software within the external computer 160 and controlled by the user may determine the color of light emitted by the video display 60, and thus, the color of light used to illuminate the object 54.

The spectrum of light 64 emitted by the video display 60 may be selected depending upon the scanning application. For monochrome scanning, a white or green light source may be emitted by the video display 60. For polychrome scanning, the video display 60 may emit a full spectrum of light (e.g., red, green, and blue) either simultaneously or separately upon separate scans. When the object is illuminated by separate colors on separate scans, the processor 162 may converge the images generated by each scan into a single scan. One type of software for converging the images is known as stitching software and is well known in the art.

The external computer 160 may further interface with the user via the video display 60. The video display 60 may have a section used as a menu screen 155, FIG. 4. The menu screen 155 may display information that is required to operate the scanning device 10. This information may include prompts to start the scanning operation, text of scanned data, and error messages. Generating the menu screen 155 and any text contained within the menu screen 155 may be done by software located in the external computer 160. The menu screen 155 may be located far enough from the area on the video display 60 used by the scanning device 10 so that the scanning device 10 will not collect extraneous light from the information being displayed on the menu screen 155.

An alternative embodiment of the scanning device 10 processes image data from the photosensor device 40 internal to the scanning device 10. Rather than processing data by a microprocessor 162 located in the external computer 160, a microprocessor, not shown, may be internal to the housing 20. A data storage device, not shown, associated with the microprocessor may also be internal to the housing 20. In this embodiment, data may be processed and stored internally, and downloaded at a later time.

Processing the data internal to the housing 20 may require user interface function buttons to be physically located on the housing 20. These function buttons may include a scan button, not shown, and an on-off switch, not shown. The scan button may be used to cause the scanning device 10 to commence a scanning operation. The on-off switch may serve to power the scanning device 10 on and off in a conventional manner.

There are several embodiments of the scanning device 10 that may apply to the housing 20. The housing 20 may be shaped to conform to the shape of the external light source used by the scanning device 10. The housing 20 may, for example, be shaped so that it may be placed adjacent to a video display 60. Therefore, the bottom wall 22 of the housing 20 facing the video display 60 may be shaped as the inverse of the video display 60, thus allowing the video display 60 and the housing 20 to abut one another. Specifically, the bottom wall 22 of the housing 20 that faces the video display 60 may be curved to match a cathode ray tube as is used in many video displays. The housing 20 may then comprise a concave bottom surface 22 with a radius equal to the convex radius of a cathode ray tube used by a video display.

Figure 5:
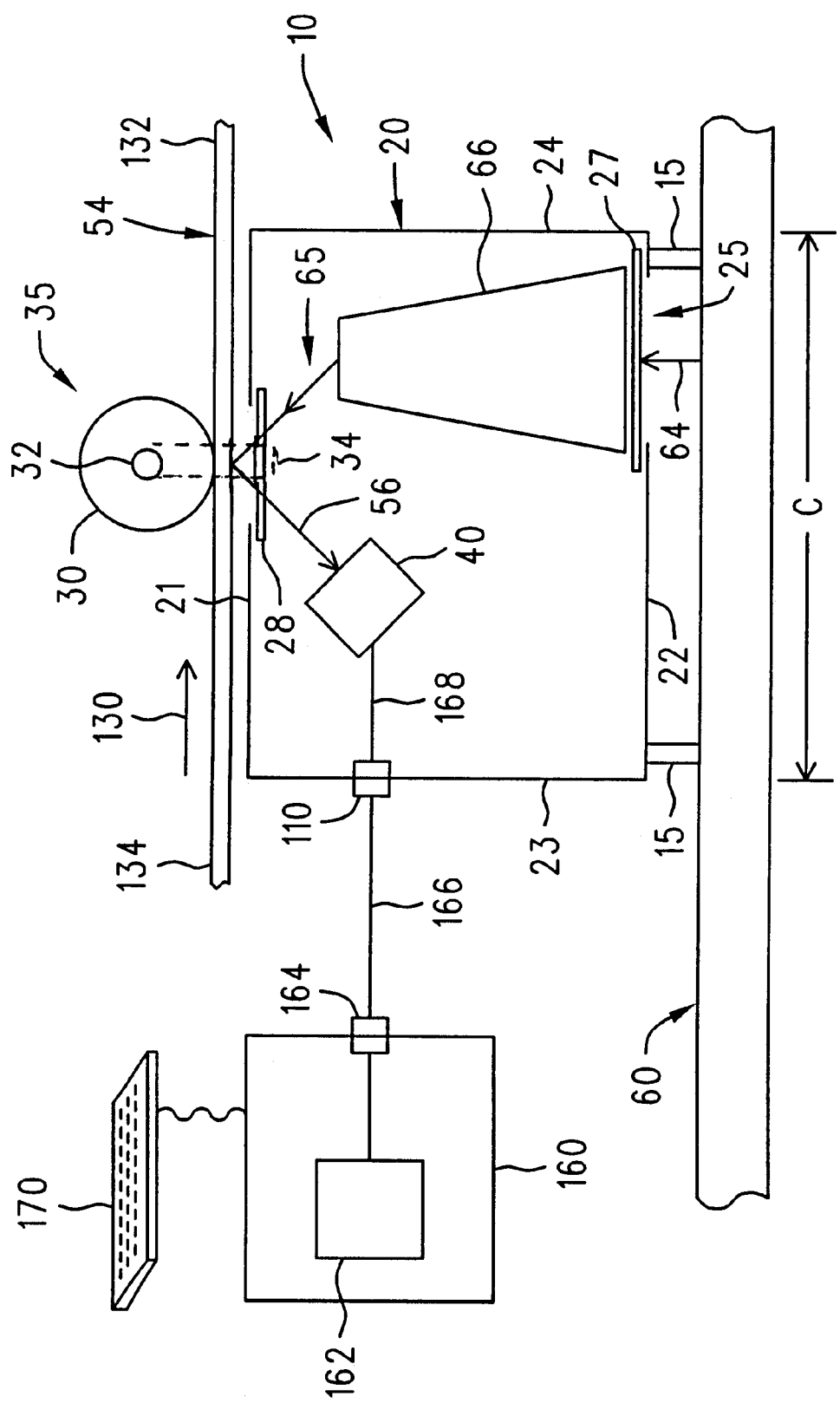
FIG. 5 is a cutaway view of the scanning device using a roller to hold a page of text.

FIG. 5 depicts an alternative embodiment of the housing 20 in which a roller assembly 35 is used in place of the strap 36. The roller 30 may be rotatably mounted on an axle portion 32 and fastened to the housing 20 by a fastener 34. The roller 30 may be placed perpendicular to the scanning direction 130. The roller 30 may also be located above the top opening 26 in the housing 20 so that the object 54 may be illuminated at the location of the roller 30. The roller 30 may have a length of, e.g., 9 inches and an outside diameter of, e.g., 0.5 inches, which allows a standard piece of 8.5 by 11 inch paper to be scanned in one pass. Roller 30 may be constructed having a metal core covered by an elastomeric coating.

The roller 30 may be connected to a drive motor, not shown, which turns the roller 30 and thus moves the object 54 over the scanning device 10 while a scan is being performed. A transducer, not shown, may be connected to the motor or the roller. The transducer may send a signal indicative of the speed of the roller 30 to the external computer 160. In this manner, the external computer 160 may determine the speed at which the object 54 is passing over the scanning device 10 in order to correlate data from the photosensor device 40 to the proper location on the scanned object 54. The external computer 160 may further control the activation and the speed of the motor.

A further embodiment of the housing 20 does not include a lens 66. Light 64 emitted by the video display 60 may pass through the transparent material 27 in the opening 25 and into the housing 20. The light may then pass through the transparent material 28 in the opening 26 to illuminate the object 54. The image beam 56 may then be processed as previous described. In this embodiment, there are no devices located between the external light source and the object 54 that optically alter the light emitted from the external light source.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A photoelectric imaging device for producing machine-readable data representative of an image of an object, said photoelectric imaging device comprising:
   a) a housing;
   b) at least one photosensor device located within said housing;
   c) a first light path extending within said housing, said first light path extending between a first point located external to said housing and said at least one photosensor device; and
   d) a second light path extending between a second point located external to said housing and said first point located external to said housing, wherein a portion of said second light path between said first point and said second point passes through said housing.

2. The apparatus of claim 1 wherein said housing comprises at least a first side and a second side, and wherein at least a portion of said second light path extends within said housing from said first side to said second side.

3. The apparatus of claim 2 wherein said first side of said housing comprises a surface that is approximately the inverse shape of a video display.

4. The apparatus of claim 2 wherein said first side of said housing comprises a concave surface.

5. The apparatus of claim 1 and further comprising a strap attached to said housing, wherein said strap is spaced from said housing and located adjacent said second light path.

6. The apparatus of claim 1 and further comprising a roller rotatably attached to said housing wherein said roller is spaced from said housing and located adjacent said second light path.

7. The apparatus of claim 6 and further comprising a motor operatively connected to said roller.

8. The apparatus of claim 6 and further comprising a transducer operatively connected to said roller.

9. The apparatus of claim 1 wherein said photosensor device comprises a contact image sensor having at least one linear array of photodetectors.

10. The apparatus of claim 1 and further comprising a processor wherein said processor is external to said housing and wherein said processor is electrically connected to said photosensor device.

11. The apparatus of claim 10 wherein said processor is located within a computer which is external to said housing.

12. The apparatus of claim 1 and further comprising a light source, wherein said light source is external to said housing and is located in said second light path.

13. The apparatus of claim 12 wherein said light source is a video display.

14. The apparatus of claim 13 wherein said video display is electrically connected to a processor.

15. The apparatus of claim 13 wherein said video display comprises a menu screen.

16. The apparatus of claim 1 and further comprising an optical device located in said second light path.

17. A photoelectric imaging system for producing machine-readable data representative of an image of an object, said photoelectric imaging system comprising:
   (a) a housing;
   (b) a light source located external to said housing;
   (c) at least one photosensor device located within said housing;
   (d) a first light path extending within said housing, said first light path extending between a first point located external to said housing and said at least one photosensor device; and
   (e) a second light path extending between said light source and said first point located external to said housing, wherein a portion of said second light path between said light source and said first point passes through said housing.

18. The system of claim 17 wherein said light source is a video display.

19. The apparatus of claim 17 wherein said housing comprises at least a first side and a second side, wherein said second light path extends between said external light source and said first point located external to said housing, and wherein said second light path extends through said housing first side and through said housing second side.

20. The apparatus of claim 17 wherein said first side of said housing comprises a surface that is approximately the inverse shape of a video display.

21. A method of scanning an object with a photoelectric imaging device, wherein said photoelectric imaging device is located within a housing, said method of scanning comprising:
   (a) illuminating said object with light emitted from a light source located external to said housing, wherein said light source generates a first light beam and a portion of said first light beam between said light source and said object passes through said housing;
   (b) maintaining relative movement between said object and said photoelectric imaging device; and
   (c) reflecting light illuminating said object onto at least one photosensor device located within said housing.

22. The method of claim 21 and further comprising causing relative movement between said object and said photoelectric imaging device numerous times and changing the color of light emitted by said light source each time said object is moved relative to said photoelectric imaging device.

23. The method of claim 21 wherein said light source is a video display.

24. The method of claim 21 wherein said housing comprises at least a first side, said housing first side adapted to receive light from said light source and wherein said method further comprises placing said housing first side adjacent to a video display.

25. The method of claim 21 and further comprising concentrating light from said light source onto said object.

26. The method of claim 21 and further comprising adjusting said light source to provide a desired light color.

27. The method of claim 21 and further comprising generating a plurality of color spectral components with said light source.

28. The method of claim 21 and further comprising processing data from said photosensor device.

29. The method of claim 28 wherein said processing is performed by a processor located external to said housing.

30. The method of claim 28 and further comprising providing a processor, wherein said processor is operatively connected to said light source.

* * * * *